United States Patent [19]

Monta et al.

[11] Patent Number: 5,471,249
[45] Date of Patent: Nov. 28, 1995

[54] SCAN CONVERTING APPARATUS FOR TRANSFERRING SUBTITLES ON A SCREEN

[75] Inventors: Hiroki Monta, Ibaraki; Ryuji Matsuura, Takatsuki, both of Japan

[73] Assignee: Matsushita Electric Industrial Co., Ltd., Kadoma, Japan

[21] Appl. No.: 105,034

[22] Filed: Aug. 11, 1993

[30] Foreign Application Priority Data

Aug. 11, 1992 [JP] Japan ................................. 4-213875

[51] Int. Cl.⁶ ................................................. H04N 5/278
[52] U.S. Cl. ........................ 348/445; 348/451; 348/452; 348/458; 348/563
[58] Field of Search ........................ 358/181, 183, 358/140, 148, 11, 147; 348/445, 450, 458, 563, 569, 448, 452, 451; H04N 5/278, 5/262, 5/265, 5/44, 5/445, 7/01

[56] References Cited

U.S. PATENT DOCUMENTS

| 4,636,857 | 1/1987 | Achiha et al. | 348/445 |
| 4,954,882 | 9/1990 | Kamemoto | 358/147 |
| 5,029,001 | 7/1991 | Tanaka et al. | 358/140 |

FOREIGN PATENT DOCUMENTS

| 59-171387 | 9/1984 | Japan. | |
| 87886 | 4/1988 | Japan | H04N 7/01 |
| 176170 | 7/1989 | Japan | H04N 5/278 |
| 1-212195 | 8/1989 | Japan. | |
| 1-272268 | 10/1989 | Japan. | |
| 799080 | 7/1990 | Japan | H04N 5/278 |
| 3-207178 | 9/1991 | Japan. | |
| 322574 | 11/1992 | Japan | H04N 5/278 |
| 4321387 | 11/1992 | Japan | H04N 5/278 |
| 347980 | 12/1992 | Japan | H04N 5/278 |

*Primary Examiner*—James J. Groody
*Assistant Examiner*—Glenton B. Burgess
*Attorney, Agent, or Firm*—Ratner & Prestia

[57] ABSTRACT

A scan converting apparatus receives an NTSC signal which is scan converted and which has a changed aspect ratio. The subtitle domain, which is vertically overscaned out of the screen and cannot be observed, is extracted and superimposed on the scan converted image. Scanning lines of a brightness output signal of a brightness/chrominance signal separator are interpolated at a scanning line interpolator and are converted to a system which has more scanning lines at a scanning line converter. An odd/even field discriminator prevents deterioration of the resolution of the subtitle letters which is caused by an interchange of the positions between two adjacent scanning lines when the subtitle is transferred to a different field. By stopping the writing of data to a field memory in the subtitle signal processor when a subtitle is transferred, a subtitle transfer can be accomplished even when there is no subtitle on the image.

5 Claims, 11 Drawing Sheets

FIG. 9(a) ORIGINAL — n-th field, (n+1)th field

FIG. 9(b) AFTER SCANNING LINE CONVERSION — n-th field, (n+1)th field

FIG. 9(c) frame

FIG. 9(d) BRIGHTNESS DISTRIBUTION — BLACK ●, DARK GREY ⦿, LIGHT GREY ◎, WHITE ○

FRAME
FIG. 11(c)

SCAN CONVERTING APPARATUS FOR TRANSFERRING SUBTITLES ON A SCREEN

FIELD OF THE INVENTION

The present invention relates to a scan converting apparatus and method which transfers the position of a movie subtitle on a TV screen. In particular, an apparatus and method are disclosed for transferring the position of a movie subtitle when a video signal with one aspect ratio (such as letter box type, i.e. vista size or cinema size) is displayed on a screen with another aspect ratio which is bigger than the former aspect ratio after the number of scanning lines has been increased.

As the size of television screens increases, it is assumed that the aspect ratio of the screen will change to a big ratio (i.e. wide screen) type.

Recently, television receivers having a scan converting apparatus have been commercialized. These receivers display a picture with a letter box type aspect ratio on a screen with a bigger aspect ratio than the former. The picture may be displayed, for example, on a Hi-Vision system with an aspect ratio of 16:9. Typically, movie subtitles are placed on the bottom part of the picture. However, when they are displayed on the screen with a bigger aspect ratio, the bottom part of the picture (i.e. the part having a subtitle) is overscanned outside of the cathode ray tube screen and thus becomes invisible. Therefore, in the scan converting apparatus of television receivers mentioned above, a subtitle is extracted and the extracted subtitle is transferred to an arbitrary position on the picture after a scan conversion in which the number of scanning lines are increased.

Figure 1:
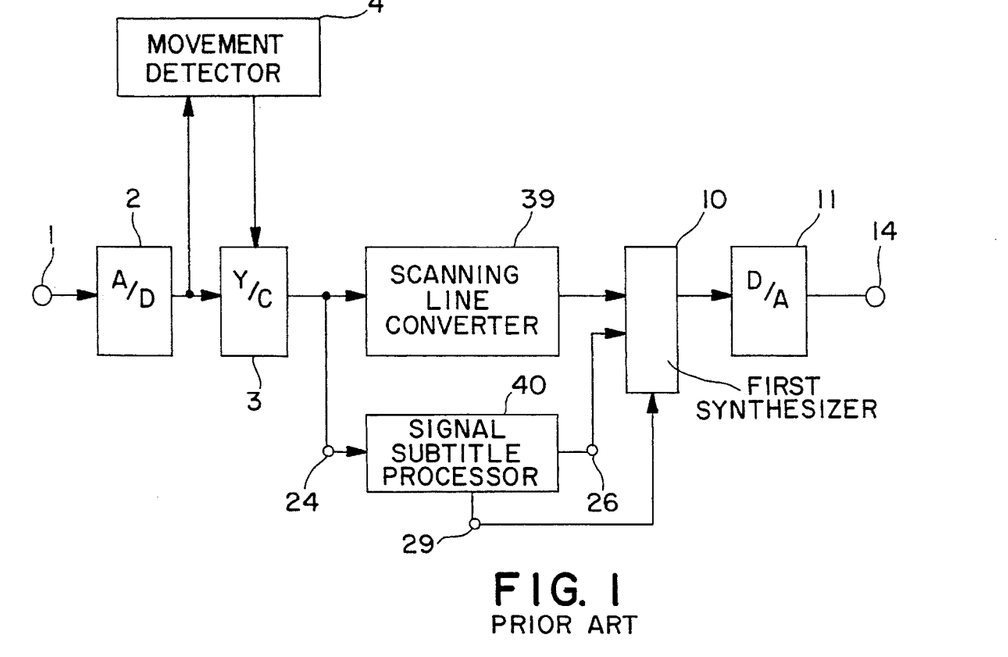
FIG. 1 is a block diagram of a scan converting apparatus in accordance with the prior art.

An example of a scan converting apparatus having subtitle processing in accordance with the prior art is explained below. FIG. 1 is a block diagram of a scan converting apparatus, which is composed of an Analog to Digital (A/D) converter 2, a brightness/chrominance signal separator 3, a movement detector 4, a scanning line converter 39, a subtitle signal processor 40, a first synthesizer 10, and a Digital to Analog (D/A) converter 11.

The circuit is explained below. A video signal is applied to a video signal input terminal 1 and is converted to a digital signal at the A/D converter 2. In the subtitle signal processor 40, a subtitle part is extracted from the brightness signal which is separated at the brightness/chrominance signal separator 3 and the extracted subtitle is transferred to a desired position.

Next, the transferred subtitle signal and the brightness signal which was scan-converted at the scan converter 39 are synthesized at the first synthesizer 10 according to a subtitle control signal from the subtitle signal processor 40. As the synthesized signal is a digital signal, it is converted to an analog signal at the D/A converter 11 and is taken out from the brightness signal output terminal 14.

Figure 2:
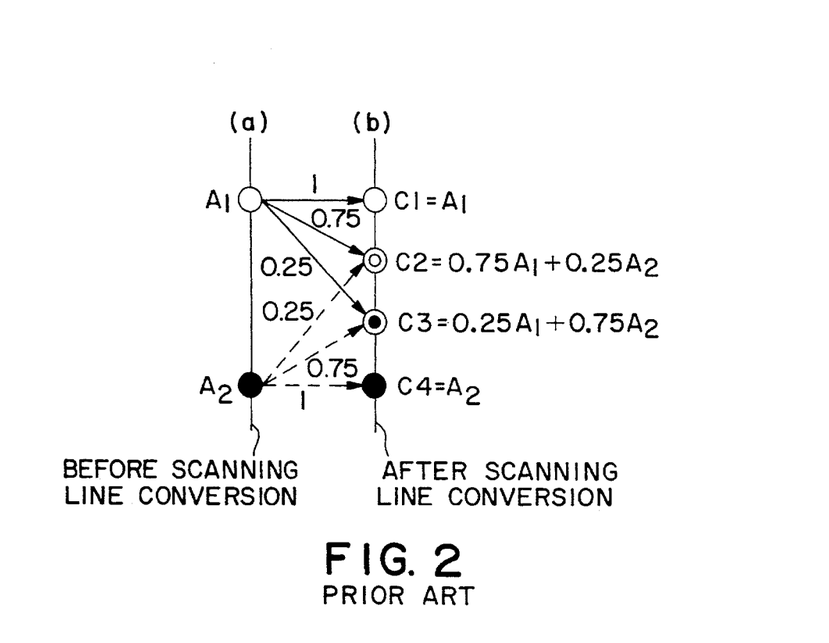
FIG. 2 illustrates operation of a scan converting means.

A principle of scan conversion is illustrated in FIG. 2, where the number of scanning lines is increased to three times the original number for convenience of explanation, although actually the number of scanning lines is usually increased 4/3 times. Assuming that the brightness of a certain spot on a certain scanning line is $A1$, and the brightness of the spot on the scanning line just below the scanning line mentioned above is $A2$. The brightnesses of the same spots as the above mentioned spots after scan conversion are $C1$ and $C4$, and the brightnesses of the spots on the two interpolated scanning lines are $C2$ and $C3$. $C$ is defined as a weighting function, $$C = a \pm A1 + b \pm A2,$$

where $a$ is a ratio of the distances from the point which brightness is $A2$ to the distance between the two points which brightnesses are $A1$ and $A2$ and $b$ is a ratio of the distances from the point which brightness is $A1$ to the distance between the two points which brightnesses are $A1$ and $A2$, the sum of the above two coefficients $a$ and $b$ is 1, namely, $$a+b=1.$$

In this case,
For C1, $a=1$
and $b=0$.
Hence, $C1=A1$.
For C2, $a=0.75$
and $b=0.25$.
Hence, $C2=0.75\ A1+0.25\ A2$.
For C3, $a=0.25$
and $b=0.75$.
Hence, $C3=0.25\ A1+0.75\ A1$.
For C4, $a=0$
and $b=1$.
Hence, $C4=A2$.
If $A1=1$, namely a white spot and $A2=0$, namely a black spot, $$C1=1,\ C2=0.75,\ C3=0.25\ and\ C4=0.$$

Here, the brightnesses of 0.75 and 0.25 are conveniently called light grey and dark grey, respectively.

In FIG. 2, before scan conversion is shown at the left (a) and after scan conversion is shown at the right (b). The points C1 and A1 and the points C4 and A2 are actually on the same position on a screen and the points C2 and C3 are located between the points of A1 and A2.

Figure 3:
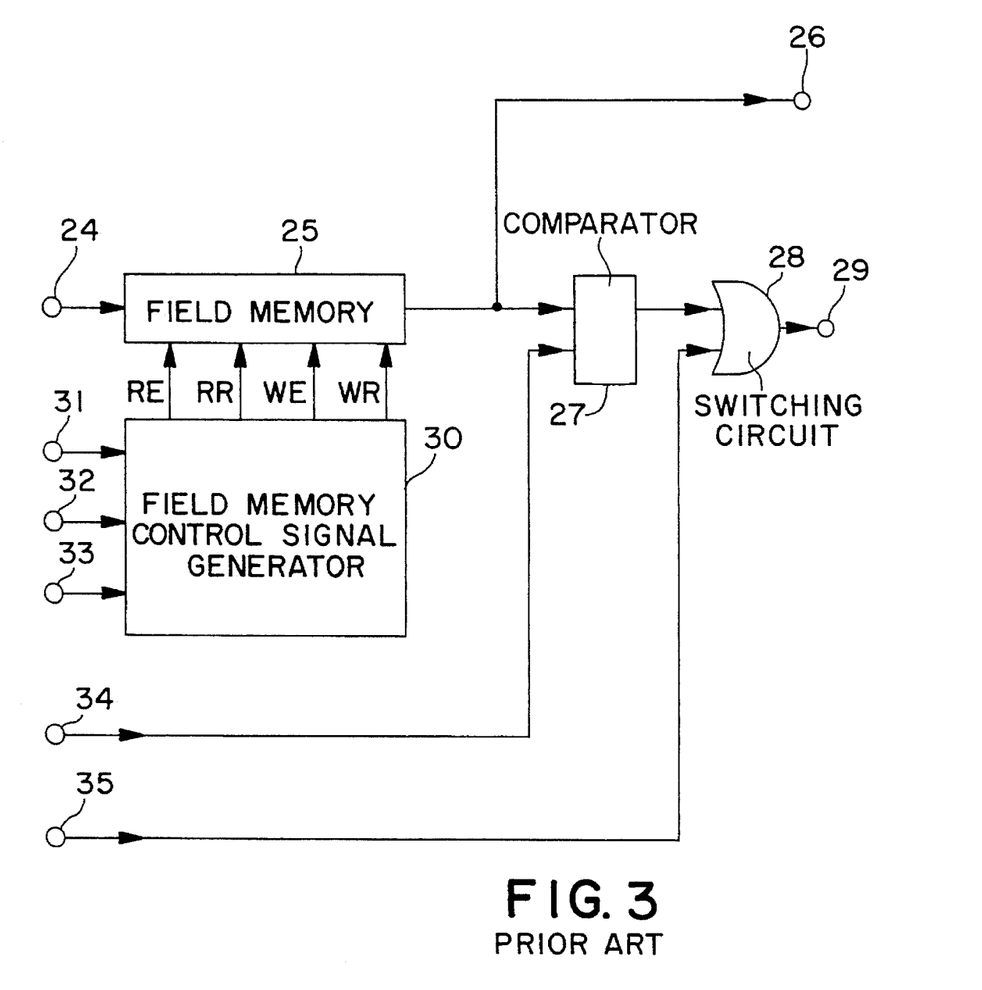
FIG. 3 is a block diagram of a superimposed dialogue signal processor in accordance with the prior art and a first exemplary embodiment of the present invention.

A block diagram of a subtitle signal processor 40 is shown in FIG. 3. A brightness signal separated from the video signal at the brightness/chrominance signal separator 3 is applied to the input terminal 24 and a subtitle signal is extracted at the field memory 25 and is transferred to a desired position. The subtitle signal is outputted from the subtitle processing signal output terminal 26 as a subtitle processing signal. On the other hand, the subtitle processing signal from the output of the field memory 25 and a subtitle threshold value from a subtitle threshold input terminal 34 are applied to a comparator 27. The subtitle signal, after being transferred, is compared with a threshold value (in terms of amplitude) at the comparator 27. The output of the comparator 27 and a constant value 1 are switched between each other at a switching circuit 28 according to a subtitle processing on/off signal from a subtitle processing on/off signal input terminal 35. The output of switching circuit 28 is transmitted to subtitle control signal output terminal 29. The field memory control signal generator 30 controls the field memory 25 by the input signals from subtitle extract start line signal input terminal 31, subtitle extract end line signal input terminal 32 and subtitle transfer address line signal input terminal 33.

The field memory control signal generator 30 generates a write enable pulse (abbreviated to WE signal) and a write reset pulse (abbreviated to WR signal) which are writing control pulses of the field memory 25, based on a subtitle extract start line signal which is inputted by an observer from the input terminal 31 and a subtitle extract end line signal which is inputted by the observer from the input terminal 32. The field memory control signal generator 30 generates a read enable pulse (abbreviated to RE signal) and a read reset pulse (abbreviated to RR signal). These are reading pulses of the field memory 25, based on a subtitle transfer address line signal from the subtitle transfer address line signal input terminal 33 which is also inputted by the observer. At the field memory 25, only a subtitle part of the brightness signal is written in by the memory control pulses and only a subtitle is read out by the subtitle transfer address line signal which is inputted by the observer. The read out signal is outputted from the subtitle processing signal output terminal 26 as a subtitle processing signal.

At the comparator 27, a letter part and a background part of the subtitle are discriminated and a signal 0 is outputted for the letter part and a signal 1 is outputted for a background part from the comparator 27. The switching circuit 28 is an OR-circuit. At the switching circuit 28, an output signal of the comparator 27 is selected when the subtitle processing is on and a constant value 1 is selected when the subtitle processing is off. This selection is made according to the subtitle processing on/off signal. These selected signals are outputted from the subtitle control signal output terminal 29 as a subtitle control signal.

However, this circuit configuration has several problems. First, vertical resolution of the brightness information in the image deteriorates after the video signal is scan converted. An increase in the number of scanning lines of the NTSC interlaced signal is explained in the following. In FIG. 4, the left side (a) shows scanning lines in the original NTSC system and (b) shows scanning lines increased to three times the original number of lines. The small circles on the vertical lines show the beam spots lined vertically on the adjacent scanning lines. The left side lines on both (a) and (b) show the n-th field and the right side lines show the next (n+1)th field. The left side line and the right side line are actually the same line on the screen. However, these lines have been drawn at different positions for illustrative purposes only.

Figure 4A:
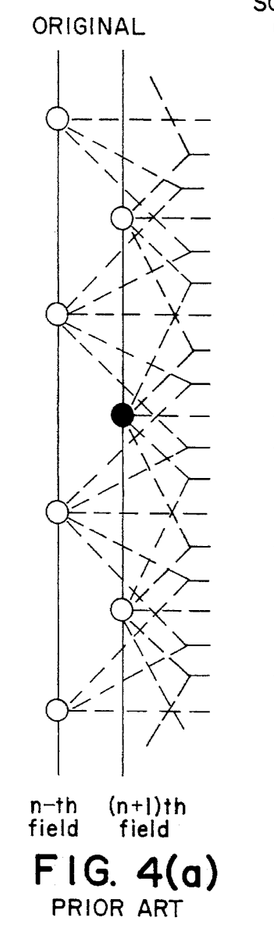
Figure 4B:
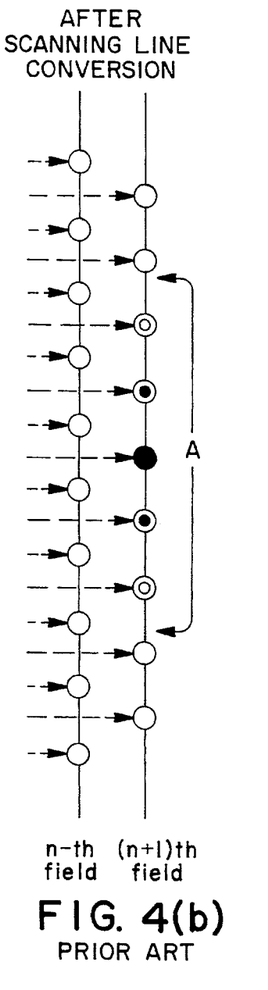
Figures 4C, 4D:
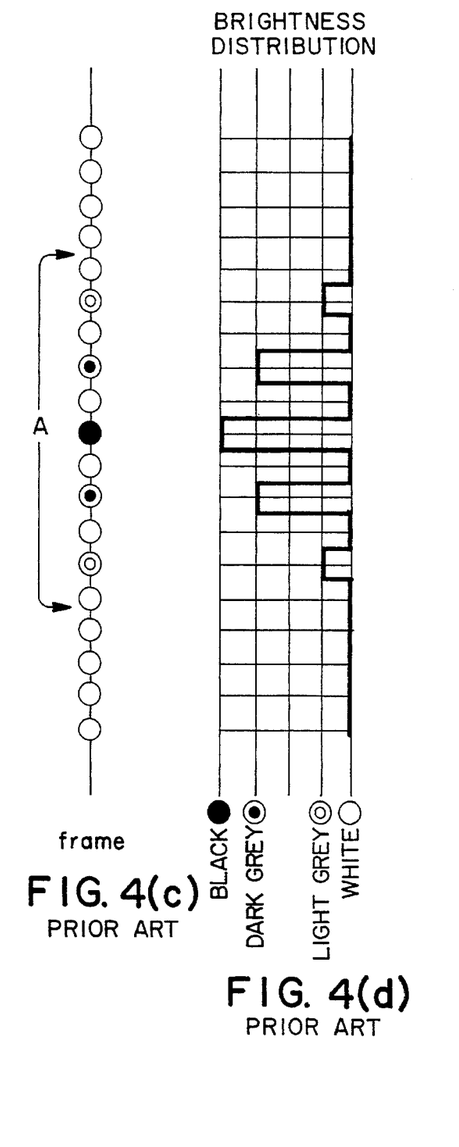

In FIG. 4(a), each point on the (n+1)th field is on the interlaced lines between the scanning lines for each point on the n-th field. Each point in (b) is, as explained in FIG. 2, on the scanning lines interpolated with weighting from the upper and lower adjacent scanning lines in (a). Here, assuming a point on the (n+1)th field in (a) is black (i.e. having a brightness of zero) and the other points are white (i.e. having a brightness of one), the brightness of each point on the (n+1)th field of FIG. 4(b), after scan conversion, is black, white, dark grey, and light grey, as shown in the right line of FIG. 4(b). On the other hand, as there are no black spots in the left line of FIG. 4(a) before scan conversion, each spot on the (n+1)th field after scan conversion is all white as shown in the left line of FIG. 4(b). As the two vertical lines of FIG. 4(a) exist in the same position, considering two adjacent fields as a frame, the spots on the vertical line are white, light grey, white, dark grey, white, black, white, dark grey, white, light grey, white from the top to the bottom in the range indicated as A. In FIG. 4(c), the brightness of each point on the vertical line during a frame is indicated by marks and FIG. 4(d) shows a brightness distribution of the vertical line taking brightness on the abscissa. The vertical brightness distribution deteriorates as a result of the interpolated white spots. Thus, the vertical resolution of the image deteriorates after scan conversion.

Second, at subtitle transfer, the top part of the subtitle letters happens to remain in the bottom part of the image. This adversely effects the picture.

Third, when a subtitle is transferred to the other position, if the subtitle stored in a field memory is only read out from the field memory, the adjacent scanning lines interchange with each other during the transfer of the subtitle between different fields. Hence, the oblique line parts of the subtitle letters become jagged and the resolution of the letters becomes deteriorated.

Fourth, when a subtitle is not in the image, as when there is no subtitle data, subtitle transfer cannot be done until a subtitle appears in the image.

Fifth, the color of the subtitle cannot be changed.

SUMMARY OF THE INVENTION

The present invention relates to a scan converting apparatus. An A/D converter is connected to a video signal input terminal and converts a video signal which is an input analogue signal including original scanning lines to a digital signal. A movement detector is connected to the output of the A/D converter and detects moving parts in the video signal. A brightness/chrominance signal separator is connected to the output of the A/D converter and the output of the movement detector and separates a brightness signal from the video signal. A scanning line interpolator is connected to a brightness signal output of the brightness/chrominance signal separator and an output of the movement detector and the interpolates scanning lines between the original scanning lines. A scanning line converter the is connected to an original scanning line output of the scanning line interpolator and an interpolated scanning line output of said scanning line interpolator and converts the original scanning lines and the interpolated scanning lines. A subtitle signal processor is connected to a brightness signal output of the brightness/chrominance signal separator and extracts a subtitle signal from the video signal and the generates a subtitle signal output. A first synthesizer is connected to a subtitle signal output of the subtitle signal processor, a subtitle control signal output of the subtitle signal processor, and a video output of said scanning line converter and synthesizes the subtitle signal output from the subtitle signal processor and the video output from the scanning line converter according to the subtitle control signal output from the subtitle signal processor to generate a further digital signal. A D/A converter is connected to an output of the first synthesizer and converts the further digital signal to a further analogue signal. According to the present invention, deterioration of vertical resolution of the brightness information in the image in the case that the numbers of scanning lines are increased by scan conversion is prevented, the resolution of the letters of the subtitle does not deteriorate regardless
of whether the subtitle is transferred to the same field
or a different field from the field where the
original subtitle existed, and a subtitle can be transferred even when it is not on the image and the
operation of the subtitle transfer is improved.

BRIEF DESCRIPTION OF THE DRAWINGS

FIGS. 4(a–d) show a scan converting means of a scan converting apparatus in accordance with the prior art.

FIGS. 9(a–d) shows a scan converting means of a scan converting apparatus in accordance with an exemplary embodiment of the present invention.

FIGS. 10(a–d) illustrates spots on scanning lines lined vertically.

FIGS. 11(a–d) illustrates spots on scanning lines lined in an oblique manner.

DETAILED DESCRIPTION OF THE INVENTION

Five exemplary embodiments of a scan converting apparatus in accordance with the present invention are explained below.

The first exemplary embodiment relates to a scan converting apparatus for a brightness signal. This embodiment prevents vertical resolution deterioration of the brightness image when the image is converted to a system having more scanning lines and which operates independently of a subtitle transfer.

The second exemplary embodiment relates to a scan converting apparatus for a brightness signal. This embodiment prevents double appearance of a subtitle by scan conversion of the image part after masking of the subtitle domain.

The third exemplary embodiment relates to a scan converting apparatus for a brightness signal. This embodiment prevents resolution deterioration of the transferred letters of the subtitle which is caused by a jagged oblique outline of the letters in the case of a subtitle transfer.

The fourth exemplary embodiment relates to a subtitle signal processor, in which a subtitle can be transferred even when an image without a subtitle lasts for a while.

The fifth exemplary embodiment relates to a scan converting apparatus for a color signal and is used together with a scan converting apparatus for a brightness signal. The subtitle color can be freely changed.

(First Exemplary Embodiment)

Figure 5:
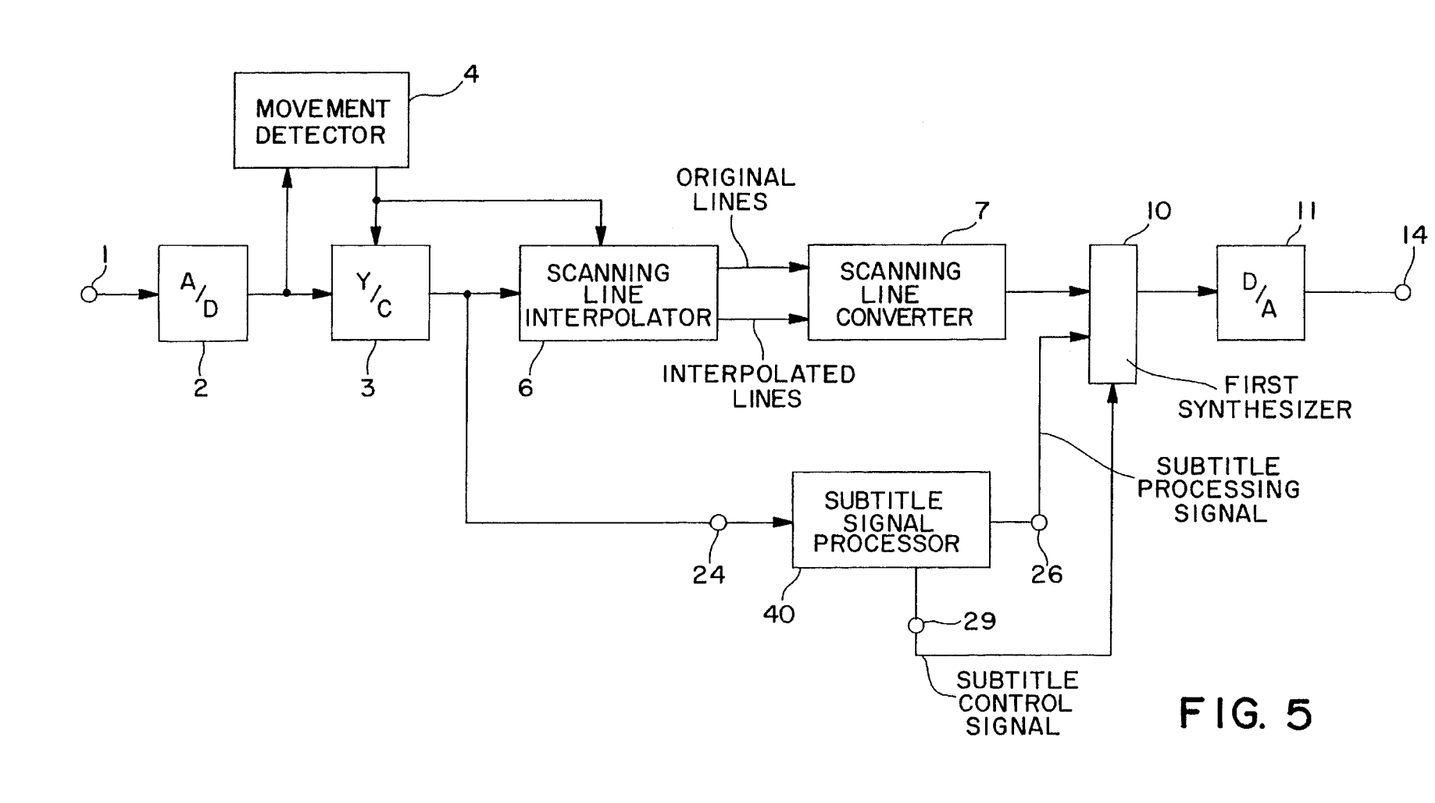
FIG. 5 is a block diagram of a scan converting apparatus for a brightness signal in accordance with a first exemplary embodiment of the present invention.

FIG. 5 is a block diagram of a scan converting apparatus for a brightness signal in accordance with the first exemplary embodiment of the present invention. The first exemplary embodiment includes an A/D converter 2, a brightness/chrominance signal separator 3, a movement detector 4, a scanning line interpolator 6, a scanning line converter 7, a subtitle signal processor 40, a first synthesizer 10, and a D/A converter 11.

An analogue video signal is applied to a video signal input terminal 1, is converted to a digital signal at the A/D converter 2, and is applied to the brightness/chrominance signal separator 3 and the movement detector 4. A brightness component is taken out from the video signal which was converted to a digital signal at the brightness/chrominance signal separator 3. The brightness component is applied to the subtitle signal processor 40 and the scanning line interpolator 6. From the scanning line interpolator 6, an original brightness signal and an interpolated signal are outputted. At the scanning line interpolator 6, interpolation is done by a signal detected at the movement detector 4. The original brightness signal which is an output of the scanning line interpolator 6 and the interpolated signal which was newly generated are converted to a new signal having more scanning lines at the scanning line converter 7. A brightness signal from the scanning line converter 7 and a subtitle processing signal from the subtitle signal processor 40 are synthesized at the first synthesizer 10 according to a subtitle control signal from the subtitle signal processor 40. A synthesized signal from the first synthesizer 10 is converted to an analogue signal at the A/D converter 11 and is taken out from the output terminal 14 as a scan converted brightness signal.

Figure 9A:
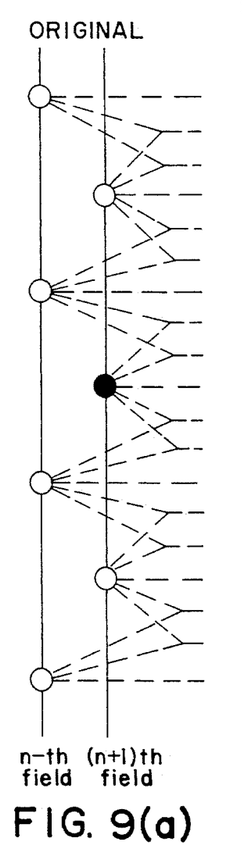
Figure 9B:
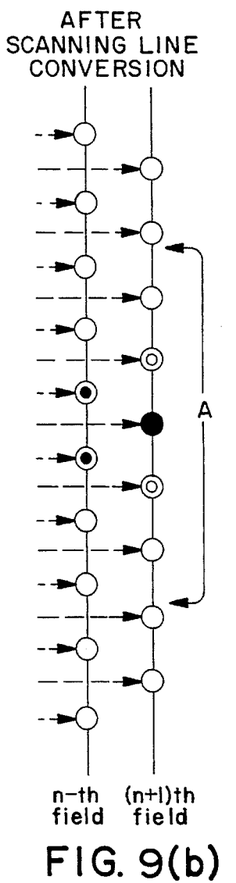
Figure 9C:
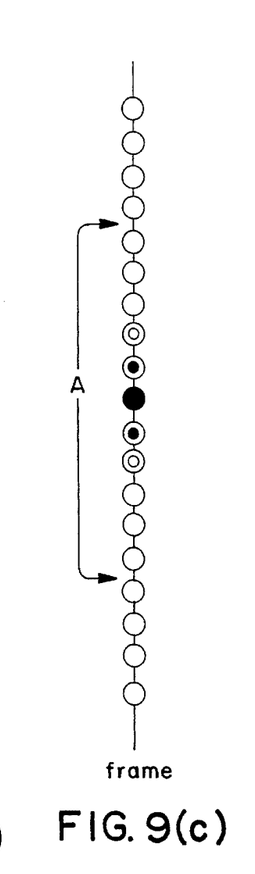
Figure 9D:
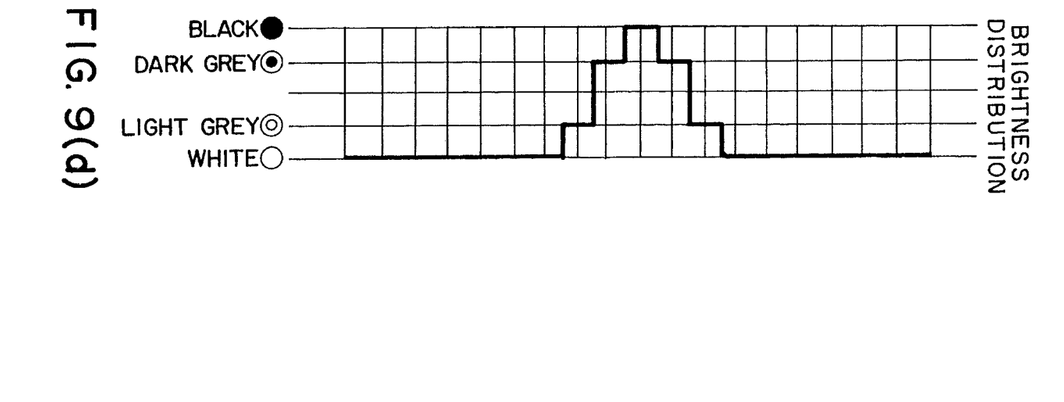

Here, the reason why a conversion of numbers of scanning lines is done after a scanning line interpolation is explained below referring FIG. 9. Similarly to FIG. 4 in the explanation of the prior art, FIG. 9(a) shows a scanning state of the NTSC system, and (b) shows a state that the numbers of scanning lines are increased by three times. Small circles on vertical lines are spots lined up vertically on the scanning lines. The left hand lines in (a) and (b) are those on the n-th field and the right hand lines in (a) and (b) are those on the (n+1)th field. Although the two vertical lines on the left and the right are located on the same position on the actual screen, they are drawn separately in the figure for illustrative purposes only. In this embodiment, conversion of the numbers of scanning lines is made after scanning line interpolation. After scanning line conversion, the black spot on the (n+1)th field gives a weighting brightness to the upper spots and the lower spots in the n-th field and in the (n+1)th field. Dark grey spots are generated in the n-th field and light grey spots are generated in the (n+1)th field, both symmetrically with a center of the position of the dark spot, as shown in FIG. 9(b). Looking at the state as a frame, as shown in FIG. 9(c), the brightnesses of the spots are white, white, white, light grey, dark grey, black, dark grey, light grey, white, white, white, from top to bottom, in the range indicated as A. FIG. 9(d) shows a brightness distribution of spots on the above mentioned vertical line. As the brightness distribution on the vertical line is continuous (i.e. from white to black and black to white), the distribution is not interrupted by white as that in the prior art. Thus, deterioration of the vertical image resolution.

The subtitle signal processor 40 employed here may be similar to that employed in the prior art.

(Second Exemplary Embodiment)

Figure 6:
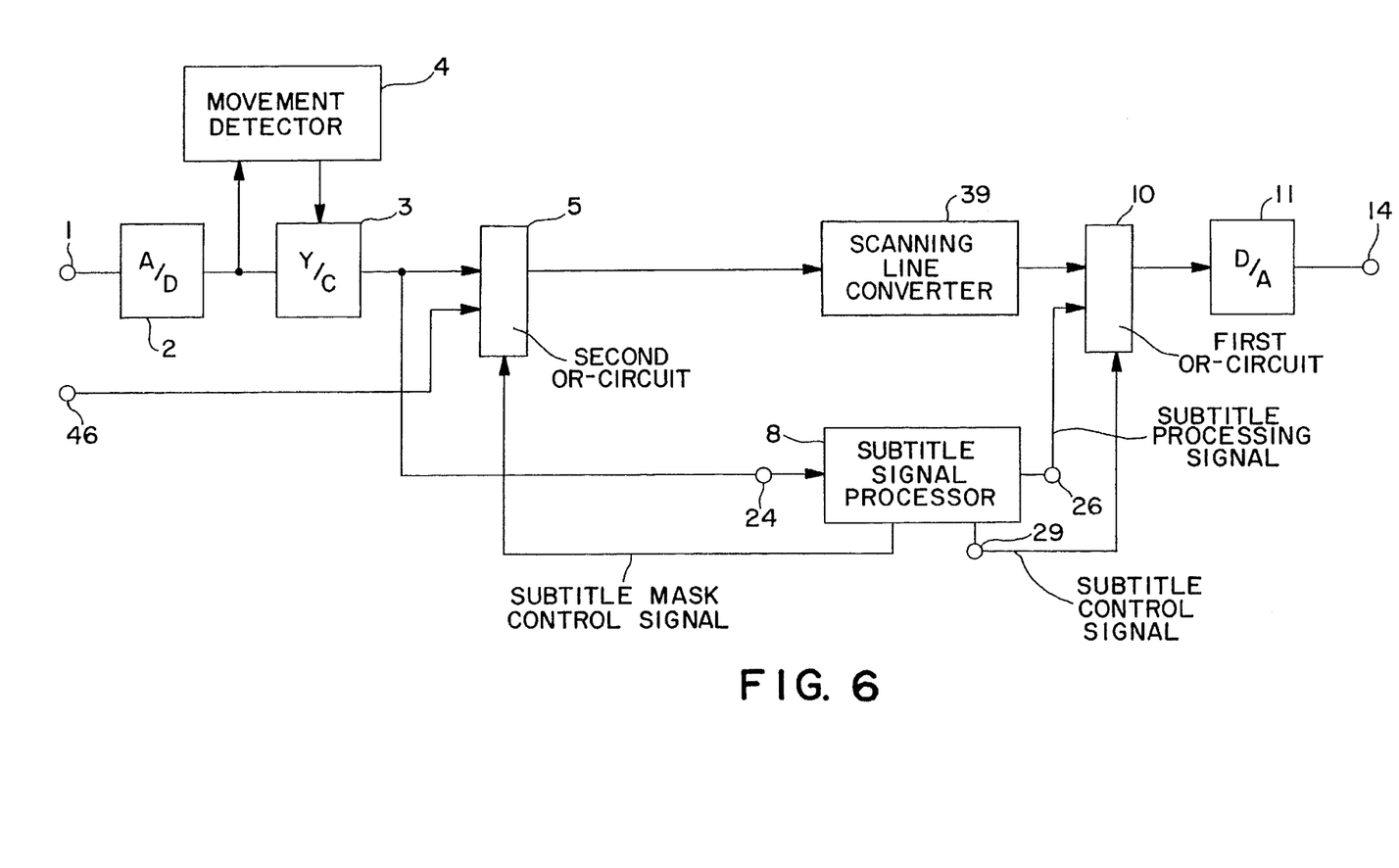
FIG. 6 is a block diagram of a scan converting apparatus for a brightness signal in accordance with a second exemplary embodiment of the present invention.

FIG. 6 is a block diagram of a scan converting apparatus for a brightness signal in accordance with the second exemplary embodiment of the present invention. The embodiment is comprised of an A/D converter 2, a brightness/chrominance signal separator 3, a movement detector 4, a scanning line converter 39, a subtitle signal processor 8, a first synthesizer 10, and a D/A converter 11.

Operation of the second exemplary embodiment of the present invention is in some ways similar to that of a scan converting apparatus in the prior art. However, in the second exemplary embodiment, a subtitle signal in the video signal is masked by a certain voltage from a constant value input terminal 46 after a subtitle extraction. This is accomplished by providing a second synthesizer 5. This prevents double subtitles from appearing on the screen. The second synthesizer 5 is controlled by a subtitle mask control signal from the subtitle signal processor 8. As the operation of the other blocks are similar to that of the first exemplary embodiment, further explanation is omitted.

Figure 12:
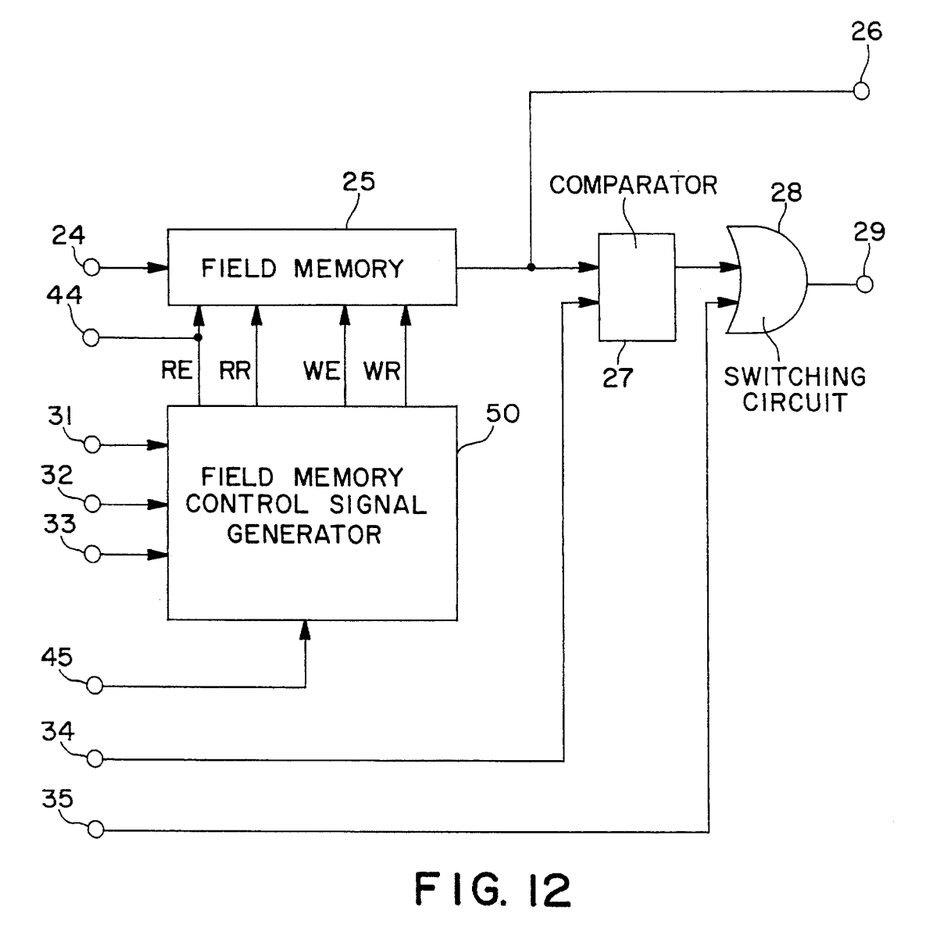
FIG. 12 is a block diagram of a superimposed dialogue signal processor in accordance with further exemplary embodiments of the present invention.

FIG. 12 is a block diagram of the subtitle signal processor 8 which is employed in the second exemplary embodiment of the present invention. The subtitle signal processor 8 includes a subtitle mask signal output terminal 44. Furthermore, a field memory control signal generator 30 is replaced by a field memory control signal generator 50.

(Third Exemplary Embodiment)

Figure 7:
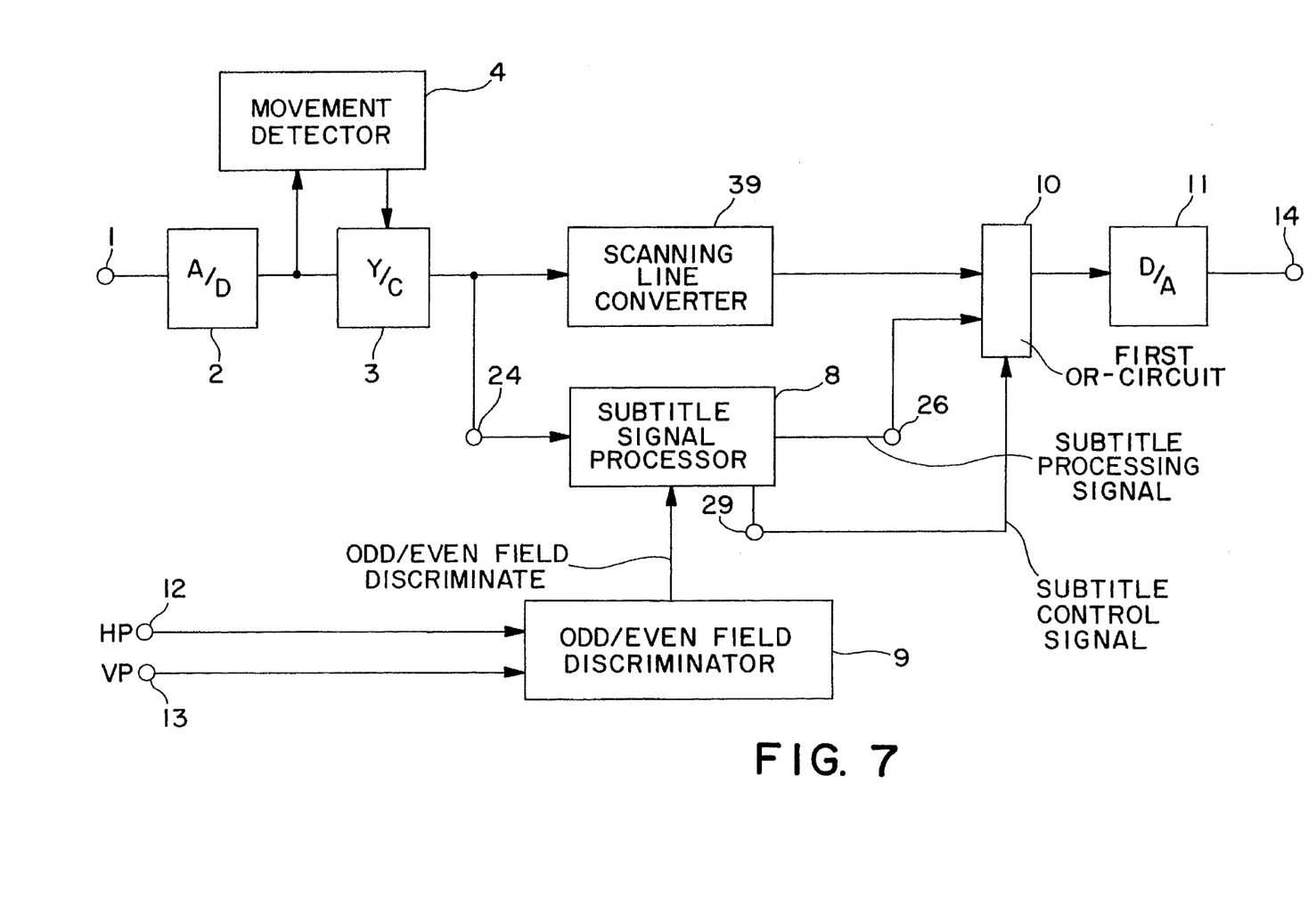
FIG. 7 is a block diagram of a scan converting apparatus for a brightness signal in accordance with a third exemplary embodiment of the present invention.

FIG. 7 is a block diagram of a scan converting apparatus for a brightness signal in accordance with the third exemplary embodiment of the present invention and is comprised of an A/D converter 2, a brightness/chrominance signal separator 3, a movement detector 4, a scanning line converter 39, a subtitle signal processor 8, a odd/even field discriminator 9, a first synthesizer 10, and a D/A converter 11.

Operation of the third exemplary embodiment of the present invention is in some ways similar to the prior art. However, in the third exemplary embodiment of the present invention, an odd/even field discriminator 9 is provided.

The subtitle processing signal is extracted from the brightness signal outputted from the brightness/chrominance signal separator 3 at the subtitle signal processor 8. Furthermore, only the extracted letter part of the subtitle domain is transferred to an arbitrary position of the scan converted image and is synthesized.

FIG. 10 shows a state before transfer. The vertically lined circles are the spots on the scanning lines and on the vertical line on the subtitle domain. The numbers in the circles indicate the order of the scanning lines counting from the top of the picture. A and B express an even field and an odd field, respectively. The A's with the same numbers as the B's identify the upper positions of the B's. These numbers and letters express not only the positions of the scanning lines but also their brightness data. In an interlaced system, the scanning lines with identical numbers in the even field are on the upper positions of the scanning lines in the odd field. The vertical lines are in an odd field, in an even field, and the next odd field, from the left. As explained in FIG. 4, these three lines are placed in the same position. The case in which the data 2A, 2B, 3A, and 3B surrounded by the real line frames are written in the field memory 25 and they are read out on the position delayed by 2H (H is one horizontal period), that is the fourth and the fifth positions in the same field is considered. FIG. 10(*b*) illustrates a state in which the data were read out. The data surrounded by the broken line frames are the data which were read out. Looking at them as a frame, the data on the above mentioned vertical lines are 1A, 1B, 2A, 2B, 3A, 3B, <u>2A,2B,3A,3B</u>, 6A, 6B, from the top.

Figure 10A:
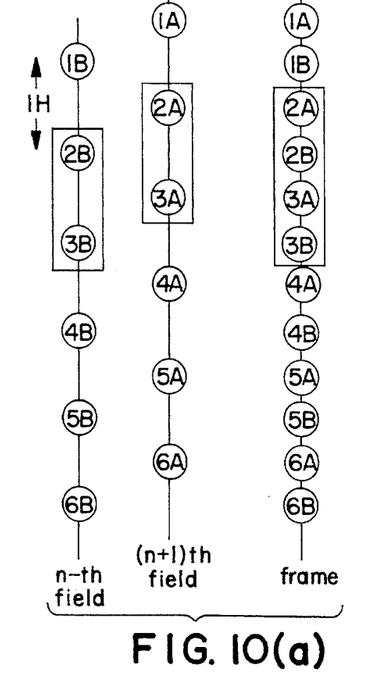
Figure 10B:
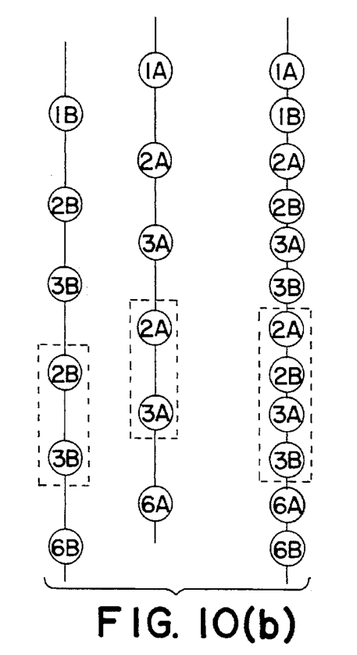
Figure 10C:
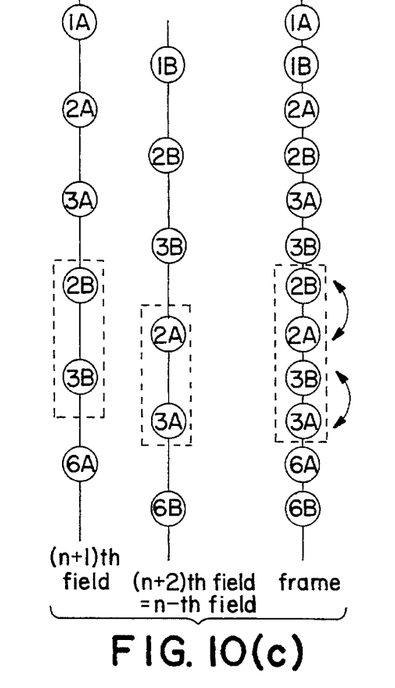
Figure 10D:
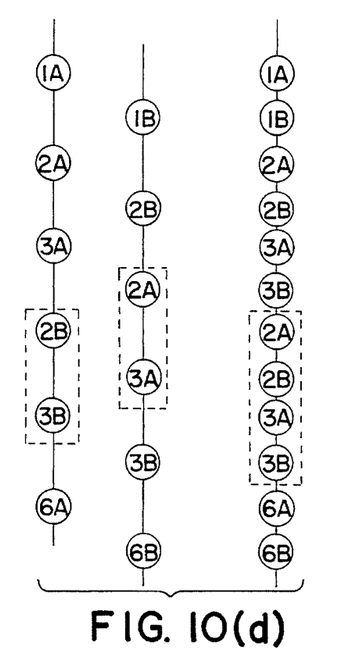

Next, the case in which the subtitle data are read out in the fourth and the fifth position in a different field is considered. The data in the n-th field are read out in the fourth and the fifth position in the (n+1) field, as shown in FIG. 10(*c*). The data in the (n+1)th field are read out in the fourth and the fifth position in the (n+2)th field, but as the (n+2)th field is the same odd field as the n-th field, the data on the above mentioned vertical line are 1A, 1B, 2A, 2B, 3A, 3B, <u>2B,2A,3B,3A</u>, 6A, 6B, downwards, looking at them as a frame (the underlined part is data to be transferred).

Although the order of the spots (shown in FIG. 10(*a*) right) does not change at a transfer in the same field, it changes at a transfer to a different field. If the spots are on a vertical line, the order of the positions of the scanning lines changes but it is not noticed by an observer. However, if they are on an oblique line, the line of the spots becomes jagged as shown in FIG. 11(*c*). This results in decreased resolution of letters in the subtitle. (a), (b), (c) and (d) in FIG. 11 correspond to those in FIG. 10, respectively and FIG. 10 illustrates an interchange of the scanning line position and FIG. 11 illustrates how a jagged line is made in an oblique line.

Figure 11A:
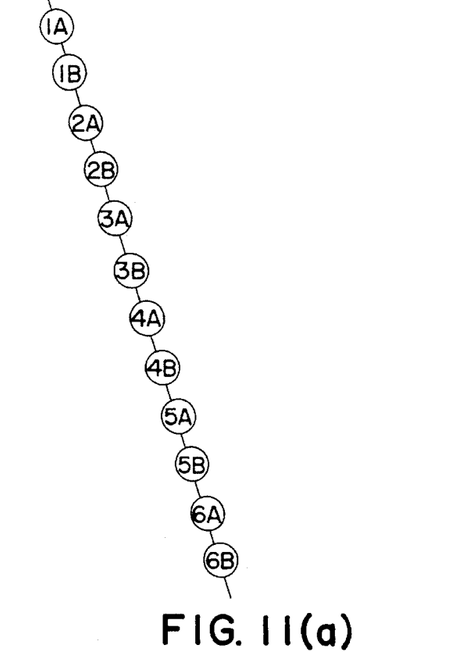
Figure 11B:
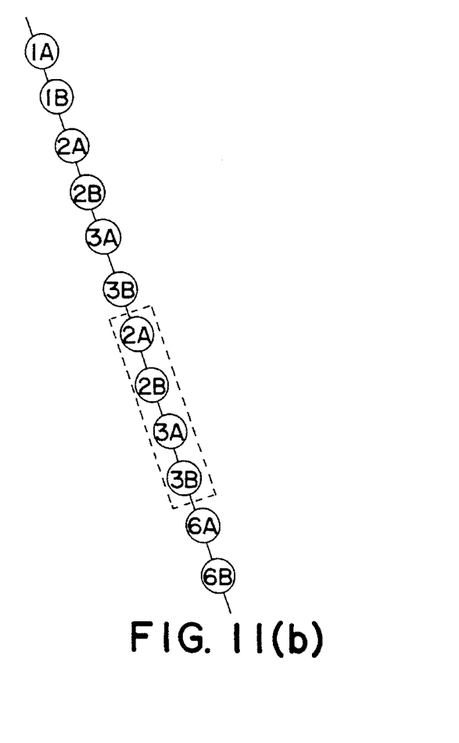
Figure 11C:
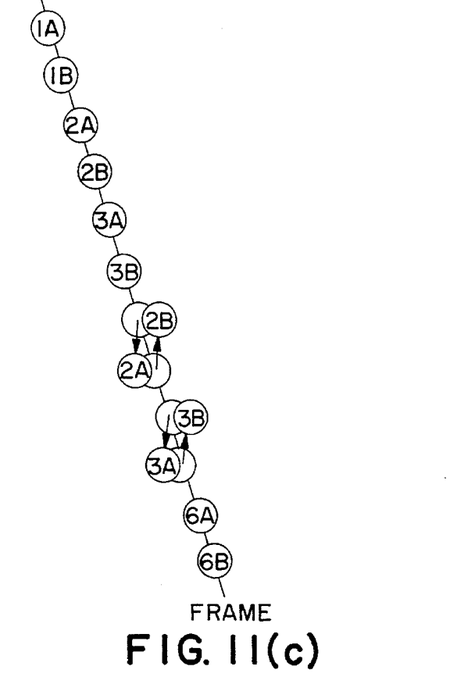
Figure 11D:
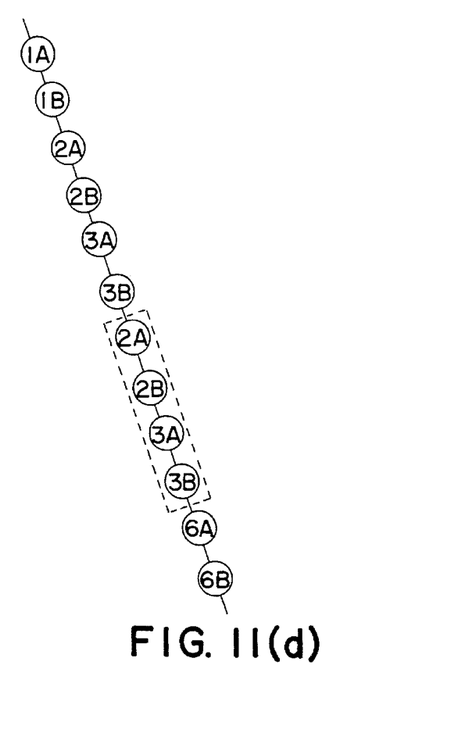

Therefore, in exemplary embodiments of the present invention, an odd/even field discriminator 9 is provided to discriminate as to whether the original field is an odd field or an even field. If the transfer is made to a different field, the transfer to an even field is delayed one scanning line (1H) more, that is, a read pulse of the field memory 25 at an even field is delayed by 1H. Thus, the position interchange of scanning lines get lost and the oblique line becomes smooth as shown in FIG. 11(*d*).

The discrimination between an odd field and an even field is made with a phase relationship between a horizontal pulse from a horizontal pulse input terminal 12 and a vertical pulse from a vertical pulse input terminal 13 at the odd/even field discriminator 9.

A subtitle signal processor employed in the third exemplary embodiment is similar to the subtitle signal processor 8 employed in the second exemplary embodiment. However, the subtitle mask signal output terminal 44 employed in the second exemplary embodiment is not employed in the third exemplary embodiment. Furthermore, the odd/even field discriminating signal input terminal 45 is not employed in the second exemplary embodiment but is employed in the third exemplary embodiment.

(Fourth Exemplary Embodiment)

A subtitle does not always appear on an image. An image sometimes lasts a scene without any subtitle. If a subtitle is not on the image, since observers cannot know where on the image the subtitle appears, they cannot take out and transfer a subtitle signal. They have to wait until the next subtitle appears on the image. In the fourth exemplary embodiment, a previous subtitle data is stored in the field memory 25 by a WE signal from the field memory control signal generator 50 (FIG. 12) until the next subtitle appears on an image. When there is no subtitle on an image, a subtitle is transferred by employing a previous subtitle date stored in the field memory 25. Thus, the subtitle transfer operation is improved.

Three exemplary embodiments of the present invention which include a scan converting apparatus for a brightness signal have been described above. However, a scan converting apparatus for a chrominance signal (as well as for a brightness signal) in the same tv receiver is desirable. A scan converting apparatus for a chrominance signal in accordance with an exemplary embodiment of the present invention is explained in the following.

(Fifth Exemplary Embodiment)

Figure 8:
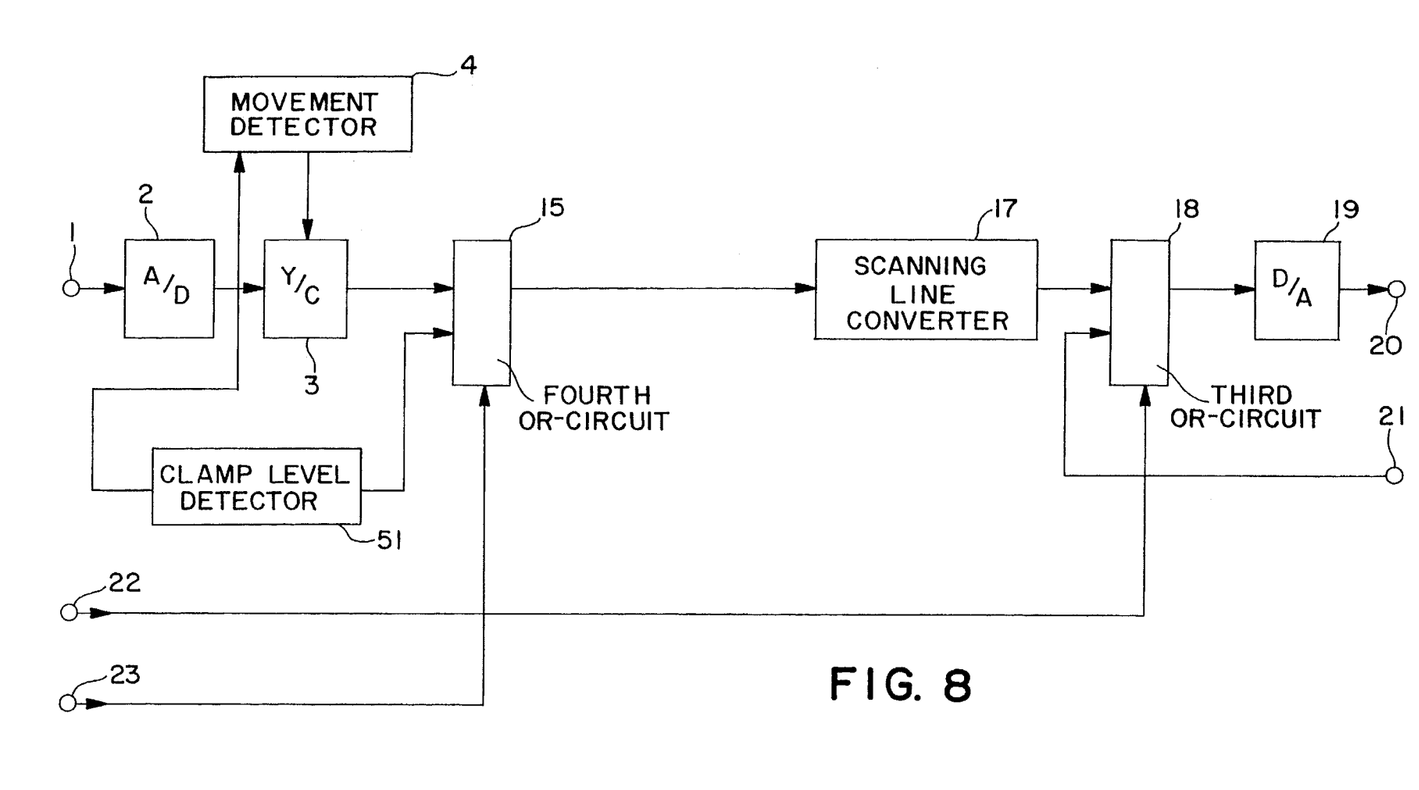
FIG. 8 is a block diagram of a scan converting apparatus for a color signal in accordance with a fourth exemplary embodiment of the present invention.

FIG. 8 is a block diagram of the scan converting apparatus for a chrominance signal in accordance with a fifth exemplary embodiment of the present invention. The scan converting apparatus is comprised of an A/D converter 2, a brightness/chrominance signal separator 3, a movement detector 4, a fourth synthesizer 15, a scanning line converter 17, a third synthesizer 18, a D/A converter 19, and a clamp level detector 51. A clamp level detector 51, a chrominance signal level input terminal 21 and a third synthesizer 18 are also shown.

An analogue video signal applied to the video signal input terminal 1 is converted to a digital signal at the A/D converter 2 and is applied to the brightness/chrominance signal separator 3 and to the movement detector 4. At the brightness/chrominance signal separator 3, only a chrominance signal is taken out from the converted digital video signal. The output of the A/D converter 2 is inputted to the clamp level detector 51 and a subtitle component is detected from the video signal. A chrominance signal from the brightness/chrominance signal separator 3 and a subtitle detecting signal from the clamp level detector 51 are applied to the fourth synthesizer 15. A subtitle part in the chrominance signal is masked by the signal which is detected at the clamp level detector 51 according to a subtitle mask control signal from the subtitle mask control signal input terminal 23. The numbers of scanning lines are increased at the scanning line converter 17.

At the third synthesizer 18, a scan converted chrominance signal and a subtitle processing signal are synthesized according to a subtitle control signal, which is outputted from the subtitle control signal output terminal 29 of the subtitle signal processor 40 (FIG. 3) or 8 (FIG. 12) and inputted from the subtitle control signal input terminal 22. The color of the letters in the subtitle domain can be freely changed by changing a digital constant value applied to the chrominance signal level input terminal 21. The synthesized chrominance signal is converted to an analogue signal at the D/A converter 19 and is taken out from the chrominance signal output terminal 20 as a scan converted chrominance signal.

The first exemplary embodiment prevents deterioration of the vertical resolution of the brightness information in the image when the number of scanning lines are increased by scan conversion.

The second exemplary embodiment prevents a top part of the subtitle domain from being left in the bottom part of the image at a subtitle transfer.

The third exemplary embodiment prevents deterioration of resolution of the letters of the subtitle regardless of whether the field to which the subtitle is transferred is the same or different from the field from which the original subtitle existed.

The fourth exemplary embodiment enables transfer of a subtitle when it is not on the image.

The fifth exemplary embodiment simplifies coloring of the subtitle.

The invention may be embodied in other specific form without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed:

1. A scan converting apparatus comprising:

a video signal input terminal, an A/D converter connected to said video signal input terminal and which converts an input analogue signal to a digital signal, a movement detector connected to the output of said A/D converter and detects moving parts in the video signal, a brightness/chrominance signal separator connected to the output of said A/D converter and the output of said movement detector and which separates a brightness signal from the video signal, a subtitle signal processor connected to a brightness signal output of said brightness/chrominance signal separator and extracts and transfers a subtitle signal, a constant value input terminal, a second synthesizer connected to said constant value input terminal and the brightness signal output of said brightness/chrominance signal separator and which masks a subtitle part of the output signal from said brightness/chrominance signal separator with a constant value from said constant value input terminal according to a subtitle mask control signal from said subtitle signal processor, a scanning line converter connected to an output of said second synthesizer and converts numbers of scanning lines, a first synthesizer connected to a subtitle signal output of said subtitle signal processor, a subtitle control signal output of said subtitle signal processor, and a video output of said scanning line converter and synthesizes said subtitle signal output from said subtitle signal processor and said video output from said scanning line converter according to said subtitle control signal output from said subtitle signal processor to generate a further digital signal, a D/A converter connected to an output of said first synthesizer and converts said further digital signal to a further analogue signal, and a video signal output terminal which receives said further analogue signal from said D/A converter.

2. A scan converting apparatus as recited in claim 1, wherein said subtitle signal processor includes a field memory for storing the subtitle signal.

3. A scan converting apparatus comprising:

a video signal input terminal, an A/D converter connected to said video signal input terminal and which converts a video signal which is an input analogue signal including an original field to a digital signal, a movement detector connected to the output of said A/D converter and detects moving parts in the video signal, a brightness/chrominance signal separator connected to the output of said A/D converter and the output of said movement detector and separates a brightness signal from the video signal, an odd/even field discriminator which receives an input horizontal pulse and an input vertical pulse and determines a phase relationship between said input horizontal pulse and said input vertical pulse to discriminate whether said original field is an odd field or an even field, a subtitle signal processor connected to an output of said odd/even field discriminator and the brightness signal output of said brightness/chrominance signal separator and extracts and generates a subtitle signal according to a discrimination result of said odd/even field discriminator, a scanning line converter connected to said brightness signal output of said brightness/chrominance signal separator and converts scanning lines, a first synthesizer connected to a subtitle signal output of said subtitle signal processor, a subtitle control signal output of said subtitle signal processor, and a video output of said scanning line converter and synthesizes said subtitle signal from a subtitle signal output from said subtitle signal processor and a video output from said scanning line converter according to a subtitle control signal output generated by said subtitle signal processor to generate a further digital signal, a D/A converter connected to an output of said first synthesizer and converts said further digital signal to a further analogue signal, and a video signal output terminal which receives said further analogue signal from said D/A converter.

4. A scan converting apparatus as recited in claim 3, further including said a subtitle signal processor comprising:

a field memory which receives a digital brightness signal and generates a subtitle signal which is extracted and read out in a desired position on the screen to a first synthesizer, a field memory control signal generator which a subtitle extract start line signal, a subtitle extract end line signal and a subtitle transfer address line signal are applied to, generates a write enable pulse, a write reset pulse, a read enable pulse and a read reset pulse, and controls said field memory, a comparator which compares a subtitle signal from said field memory and a threshold value from a subtitle threshold input terminal and discriminates which is bigger said subtitle signal or said subtitle threshold value, a switching circuit which switches an output of said comparator and a subtitle processing on/off signal from a subtitle processing on/off signal input terminal and supplies a subtitle control signal to said first synthesizer, and means for storing subtitle data in said field memory by said write enable pulse and for transferring a subtitle domain to a desired position during subtitle transfer.

5. A scan converting apparatus comprising:

a video signal input terminal, an A/D converter connected to said video signal input terminal and which converts a video signal which is an input analogue signal to a digital signal, a clamp level detector connected to an output of said A/D converter, a brightness/chrominance signal separator connected to the output of said A/D converter and separates a brightness signal from the video signal and which generates a chrominance signal, a first synthesizer connected to a chrominance signal output of said brightness/chrominance signal separator, an output of said clamp level detector, and a subtitle mask control signal input terminal and masks a subtitle area signal of the chrominance signal from said brightness/chrominance signal separator with a clamp level according to a subtitle mask control signal from said subtitle mask control signal input terminal, a scanning line converter connected to an output of said first synthesizer and converts scanning lines, a second synthesizer, connected to an output of said scanning line converter and which receives an input chrominance signal level which changes color of subtitle letters and a subtitle control signal input, synthesizes the chrominance signal from said scanning line converter and said input chrominance signal level according to said subtitle control signal to generate a further digital signal, a D/A converter connected to an output of said second synthesizer and converts said further digital signal to a further analogue signal, and a video signal output terminal which receives said further analogue signal from said D/A converter.

* * * * *